US012410634B2

(12) United States Patent
Sintonen et al.

(10) Patent No.: US 12,410,634 B2
(45) Date of Patent: Sep. 9, 2025

(54) LOCK ARRANGEMENT

(71) Applicant: iLOQ Oy, Oulu (FI)

(72) Inventors: Tommi Sintonen, Oulu (FI); Matti Ylitalo, Oulu (FI); Samuli Maronen, Oulu (FI); Juha Kyrönlampi, Oulu (FI)

(73) Assignee: iLOQ Oy, Oulu (FI)

(*) Notice: Subject to any disclaimer, the term of this patent is extended or adjusted under 35 U.S.C. 154(b) by 235 days.

(21) Appl. No.: 18/344,290

(22) Filed: Jun. 29, 2023

(65) Prior Publication Data

US 2025/0003255 A1 Jan. 2, 2025

(51) Int. Cl.
*E05B 9/00* (2006.01)
*E05B 9/08* (2006.01)

(52) U.S. Cl.
CPC .................................... *E05B 9/084* (2013.01)

(58) Field of Classification Search
CPC . E05B 9/00; E05B 9/084; E05B 15/02; E05B 17/00; E05B 17/0058; E05B 17/0054; E05B 17/0062; E05B 17/0066; E05B 47/0692; E05B 63/08; E05B 2017/0095; E05B 2017/2084; E05B 2017/2096; Y10T 70/8568
USPC ........... 70/1.5, 367, 370, 416, 417, 422, 452
See application file for complete search history.

(56) References Cited

U.S. PATENT DOCUMENTS 1,968,555 A * 7/1934 Horne ................. E05B 17/0062 70/380
3,276,232 A 10/1966 Bourgeois
3,427,413 A * 2/1969 Maddison ............... E05B 45/06 70/417
4,056,955 A * 11/1977 Glass ...................... E05B 29/00 70/375

(Continued)

FOREIGN PATENT DOCUMENTS

CA 2047768 A1 1/1992
DE 19604532 A1 * 8/1997 ............. E05B 15/02

(Continued)

OTHER PUBLICATIONS

Oct. 2, 2024 Search Report issued in International Patent Application No. PCT/EP2024/068325, pp. 1-12.

*Primary Examiner* — Suzanne L Barrett
(74) *Attorney, Agent, or Firm* — Nixon & Vanderhye PC

(57) ABSTRACT

According to a first aspect of the invention, there is provided a lock arrangement comprising a lock cylinder having a housing with an external thread to couple the lock cylinder with a lock case, wherein the housing further comprises a flange and at least one groove extending in a longitudinal direction of the lock cylinder. The lock cylinder further comprises an escutcheon having a through hole configured to receive the lock cylinder such that the flange compresses the escutcheon against a counter surface, wherein the through hole comprise at least one projection extending towards the lock cylinder, wherein the escutcheon, when assembled with the lock cylinder, comprises a coupled state (Continued)

in which the projection is in the groove to prevent rotational movement of the escutcheon in relation to the lock cylinder around the longitudinal direction of the lock cylinder, and an uncoupled state in which the projection is at least partly out of the groove to enable rotational movement of the escutcheon in relation to the lock cylinder.

16 Claims, 7 Drawing Sheets

(56) References Cited

U.S. PATENT DOCUMENTS

| | | | | | |
|---|---|---|---|---|---|
| 4,195,502 | A * | 4/1980 | Best | E05B 17/0062 70/422 |
| 4,297,862 | A * | 11/1981 | Solovieff | E05B 9/084 70/451 |
| 4,338,806 | A * | 7/1982 | Cox | E05B 63/006 70/417 |
| 4,424,694 | A * | 1/1984 | Mochida | E05B 15/1614 70/417 |
| 4,446,709 | A * | 5/1984 | Steinbach | E05B 27/086 70/424 |
| 4,550,581 | A * | 11/1985 | Best | E05B 17/0058 70/422 |
| 4,667,994 | A * | 5/1987 | Foshee | E05B 63/16 292/358 |
| 4,679,420 | A * | 7/1987 | Yang | E05B 17/0058 70/222 |
| 5,010,755 | A * | 4/1991 | Best | E05B 17/0058 70/222 |
| 5,481,890 | A * | 1/1996 | Millman | E05B 3/065 292/357 |
| 5,611,225 | A * | 3/1997 | Resch | E05B 17/0062 70/495 |
| 6,427,505 | B2 | 8/2002 | Imedio | |
| 8,276,415 | B2 * | 10/2012 | Trempala | E05B 47/063 70/369 |
| 2014/0144193 | A1 | 5/2014 | Lahiji et al. | |

FOREIGN PATENT DOCUMENTS

| | | | | |
|---|---|---|---|---|
| EP | 2284335 | A2 * | 2/2011 | E05B 15/02 |
| EP | 3002395 | A1 * | 4/2016 | E05B 17/0062 |
| EP | 3006651 | B1 | 3/2018 | |
| EP | 3 628 803 | | 4/2020 | |
| ES | 2358087 | T3 * | 5/2011 | E05B 65/0025 |
| FR | 2554494 | A1 * | 5/1985 | |
| GB | 2216944 | A * | 10/1989 | E05B 15/1614 |
| GB | 2287749 | A * | 9/1995 | E05B 15/02 |
| IT | 201800003671 | | 9/2019 | |
| WO | WO-2013172776 | A1 * | 11/2013 | E05B 15/02 |

* cited by examiner

LOCK ARRANGEMENT

FIELD

Various embodiments relate to a field of lock assemblies, especially safety features of the lock assemblies.

BACKGROUND

Lock assemblies are used, for example, in doors to prevent access of unauthorized persons. The lock arrangement may be attempted to break by applying violent force for visible components of the lock, for example. The lock arrangement may comprise safety features intended to prevent or at least make it more difficult to break the lock. The known safety features of lock assemblies have some drawbacks.

Hence, there is a need for more sophisticated safety features of the lock assemblies.

BRIEF DESCRIPTION

According to an aspect, there is provided subject matter of independent claim. Dependent claims define some embodiments.

One or more examples of implementations are set forth in more detail in the accompanying drawings and the description of embodiments.

LIST OF DRAWINGS

Some embodiments will now be described with reference to the accompanying drawings, in which.

DESCRIPTION OF EMBODIMENTS

The following embodiments are only examples. Although the specification may refer to “an” embodiment in several locations, this does not necessarily mean that each such reference is to the same embodiment(s), or that the feature only applies to a single embodiment. Single features of different embodiments may also be combined to provide other embodiments. Furthermore, words “comprising” and “including” should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

The applicant, iLOQ Oy, has invented many improvements for the electromechanical locks, such as those disclosed in various European and US patent applications and patents. A complete discussion of all those details is not repeated here, but the reader is advised to consult those publications.

Nevertheless, the solution of the invention is intended to the electromechanical locks, it may be applied in traditional locks as well. The lock arrangement described in this application may be used for example in so called mortise locks.

According to a first aspect of the invention, there is provided a lock arrangement comprising a lock cylinder having a housing with an external thread to couple the lock cylinder with a lock case, wherein the housing further comprises a flange and at least one groove extending in a longitudinal direction of the lock cylinder, and an escutcheon having a through hole configured to receive the lock cylinder such that the flange compresses the escutcheon against its counter surface, wherein the through hole comprise at least one projection extending towards the lock cylinder, wherein the escutcheon, when assembled with the lock cylinder, comprises a coupled state in which the projection is in the groove to prevent rotational movement of the escutcheon in relation to the lock cylinder around the longitudinal axis of the lock cylinder, and an uncoupled state in which the projection is at least partly out of the groove to enable rotational movement of the escutcheon in relation to the lock cylinder.

Figure 1:
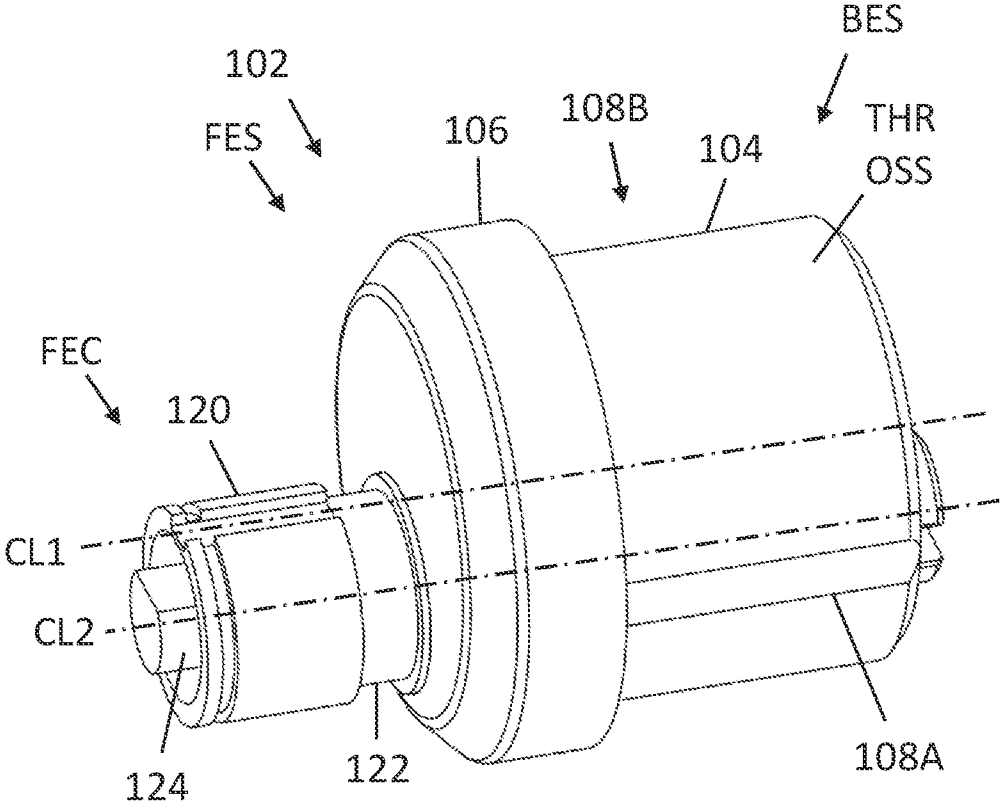
FIG. 1 illustrates a lock cylinder according to an embodiment of the invention.

Let us first look at FIG. 1 which illustrates the lock cylinder 102 of the lock arrangement 100. The lock cylinder may comprise the housing 104 having the external thread THR on the outer surface OSH of the housing 104. The external thread may be arranged on a back end BES of the housing 104 of the lock cylinder 102. The back end refers to a part of the lock cylinder which is configured to enter inside the lock case and comprises a tailpiece. The thread may extend from the back end towards a front end FES of the lock cylinder 102. The thread is used to couple the lock cylinder with the lock case. The lock case refers to the body of the lock, which is inside a door, for example. The lock case may comprise a hole with an internal thread configured to receive the external thread of the housing of the lock cylinder. The lock case is not illustrated in the Figures. The lock case may be for example a standard lock case intended for mortise locks. Therefore, the lock case itself is not described in detail in this application.

Still referring to FIG. 1, the lock cylinder 102 further comprises the flange 106 extending away from the lock cylinder 102. In other words, extending substantially away from a centerline CL1 of the lock cylinder 102. The centerline CL1 of the lock cylinder may be the same as the longitudinal direction of the lock cylinder 102 as illustrated in FIG. 1. It is good to realize that there is also illustrated a centerline CL2 of a lock core 124 in FIG. 1. As can be seen in FIG. 1, the lock core is not in the middle of the lock cylinder and therefore its centerline differs from the centerline of the lock cylinder. The flange 106 may extend substantially perpendicularly from the outer surface OS of the housing 104 in which the external thread THR is arranged. The flange may be arranged in the vicinity of the front end of the housing of the lock cylinder. The flange forms a collar around the housing, and the flange may cover substantially the whole circumference of the housing.

The lock cylinder 102 further comprises at least one groove 108 (A, B) arranged on the outer surface OS of the housing 104 of the lock cylinder 102. Hence, the groove may be on the same surface as the external thread. The groove may extend in the longitudinal direction of the lock cylinder from the back end towards the front end.

Figure 2:
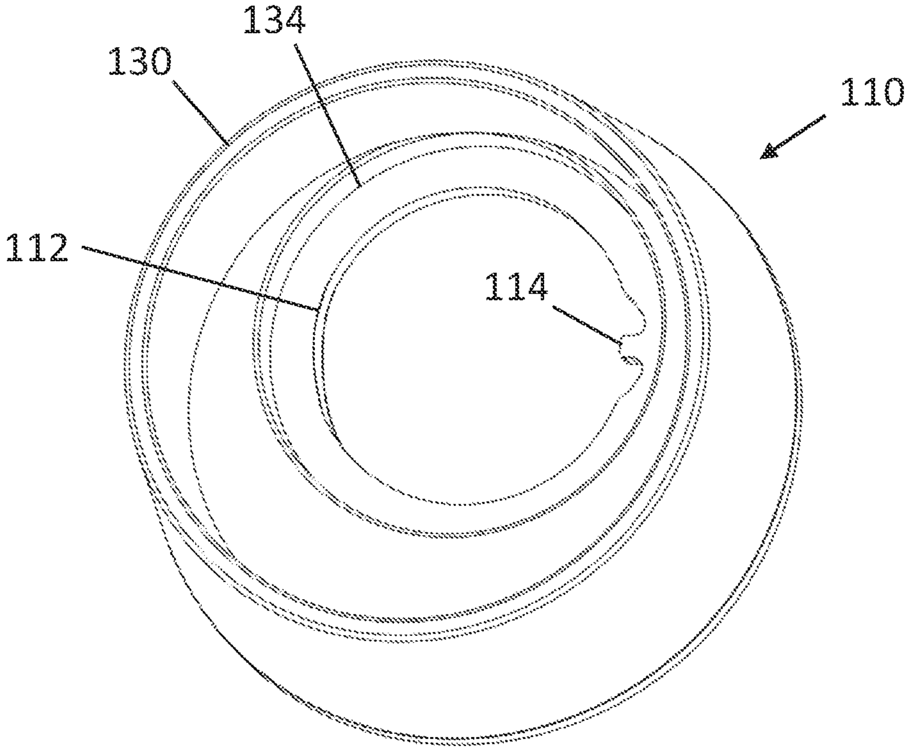
FIG. 2 illustrates an escutcheon according to an embodiment of the invention.

Referring now to FIG. 2, the lock arrangement 100 further comprises the escutcheon 110 (covering plate). The escutcheon 110 may comprise the through hole 112 configured to receive the lock cylinder 102 such that the escutcheon is substantially around the lock cylinder. The through hole 112 comprise at least one projection 114 extending towards the lock cylinder 102 when it is arranged into the through hole 112. The projection may be arranged on an inner surface of the hole. The projection may extend substantially perpendicularly in relation to the center line CL1 of the lock cylinder 102. The back end BES of the lock cylinder 102 is configured to go through the hole 112 such that the flange 106 is against the escutcheon 110. The escutcheon 110 may comprise a cavity 134 for receiving the flange 106. The flange compresses the escutcheon against its counter surface when the lock cylinder is coupled with the lock case. The counter surface may be a surface of the door, for example. There may also be one or more other components between the escutcheon and the surface of the door, like a spring, for example. The escutcheon may be made of metal by casting. The material may be zamak, for example.

Figure 9:
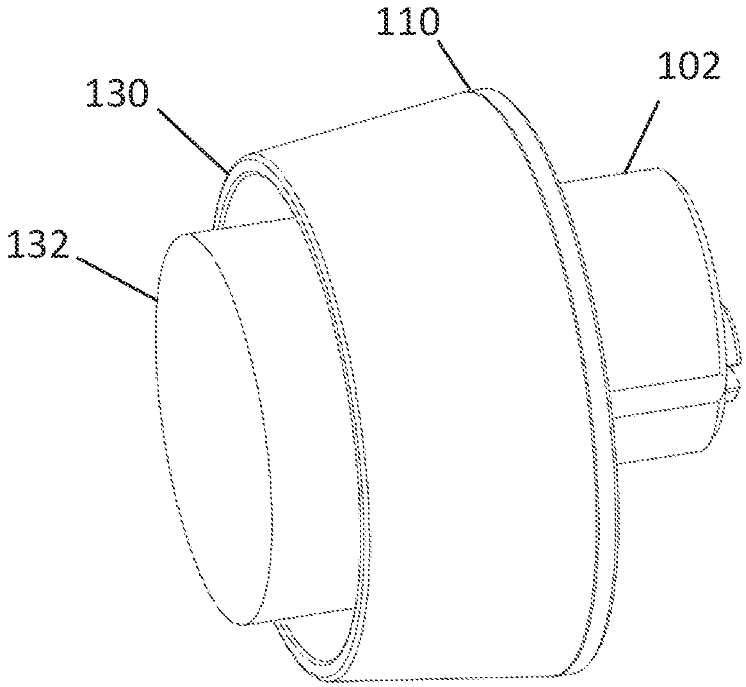

The escutcheon 110 may further comprise a collar 130 for protecting a doorknob 132. The collar may extend substantially in parallel with the longitudinal direction of the lock cylinder. In other words, away from the surface of the door. The collar may cover, at least partly, the circumference of the escutcheon and/or the doorknob. Hence, the doorknob stays, at least partly, inside the collar which protects the doorknob when the lock arrangement with the doorknob is assembled into the door as illustrated in FIG. 9.

Figure 3A:
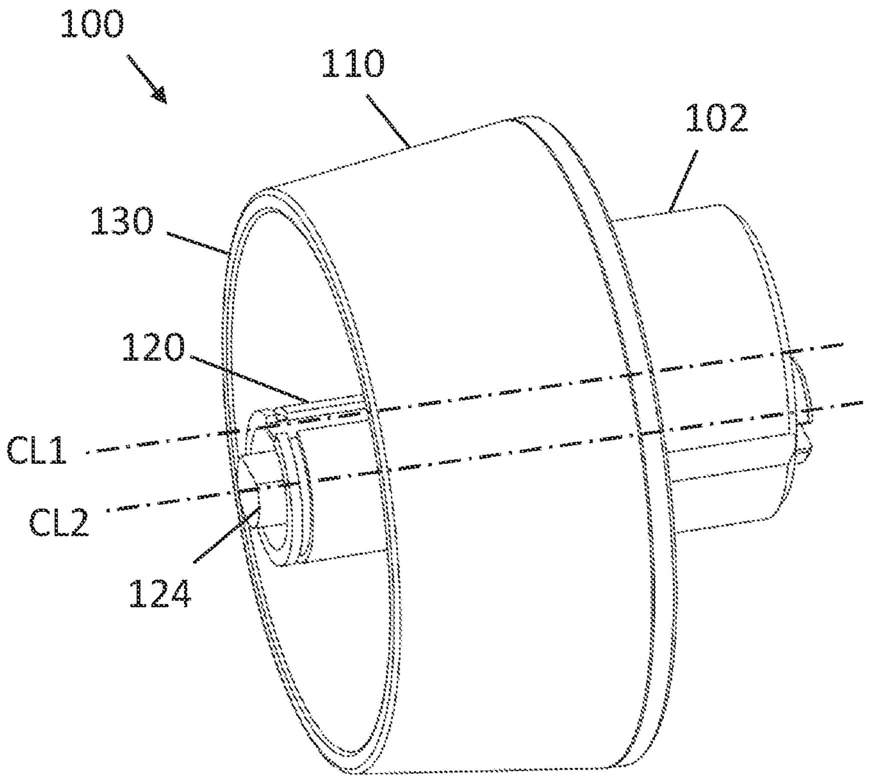
FIGS. 3A and 3B illustrate the lock cylinder and the escutcheon according to and embodiment of the invention.
Figure 3B:
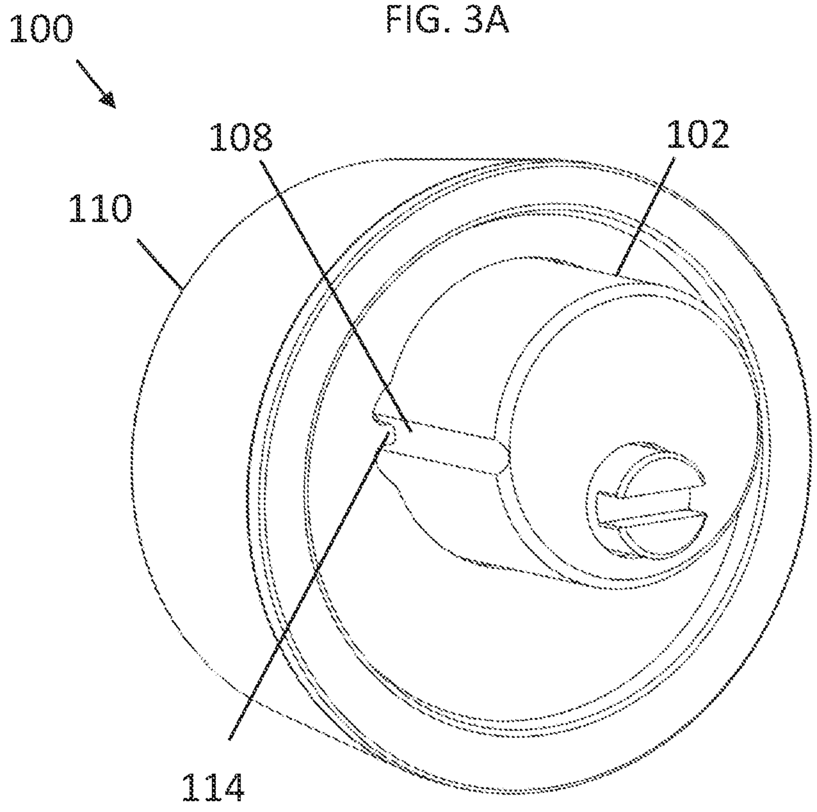
Figure 4A:
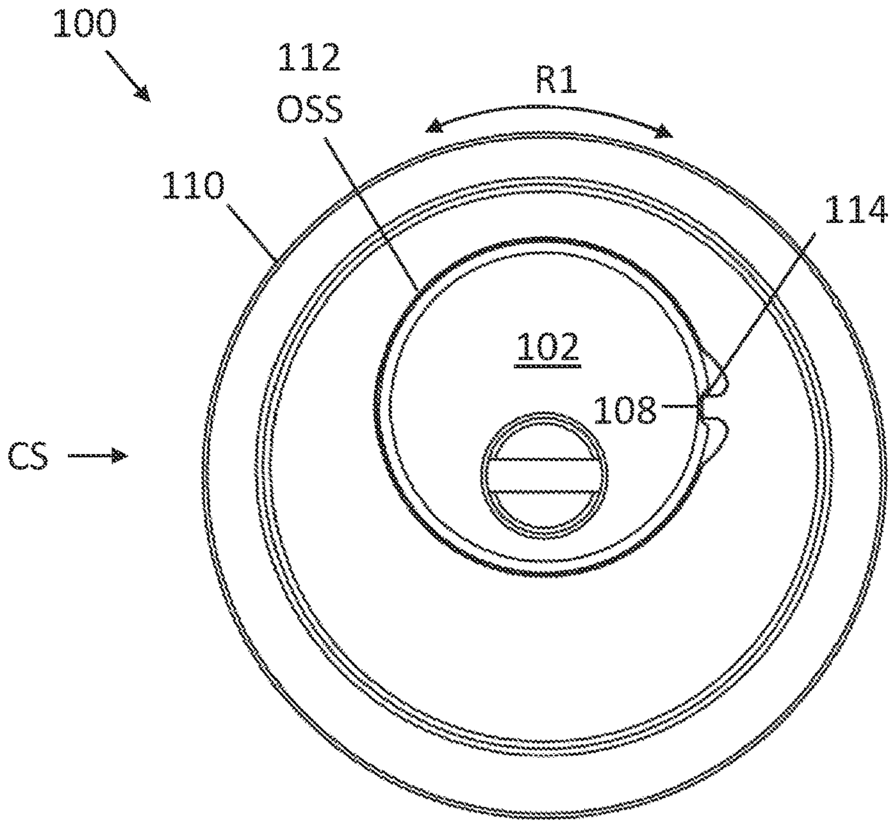
FIGS. 4A and 4B illustrate two states of the escutcheon according to embodiments of the invention.
Figure 4B:
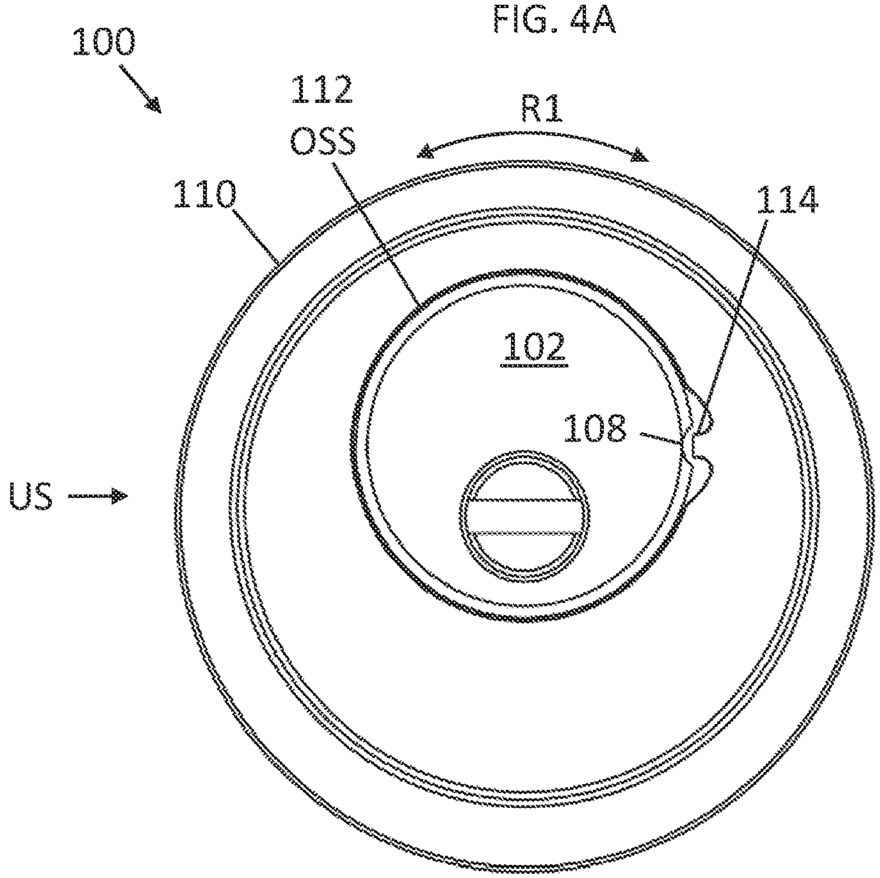

FIGS. 3A and 3B illustrate the lock cylinder 102 and the escutcheon 110 such that the lock cylinder 102 is set through the hole 112 of the escutcheon 110, in other words in the assembled state. Referring now to FIGS. 3B and 4A, in an embodiment the escutcheon 110, when assembled with the lock cylinder 102, comprises the coupled state CS in which the projection 114 is in the groove 108 to prevent rotational movement R1 of the escutcheon 110 in relation to the lock cylinder 102 around the centerline CL1 of the lock cylinder 102. When the lock cylinder is set through the hole of the escutcheon, the projection enters the groove. As the groove extends in the longitudinal direction of the lock cylinder and the projection extends perpendicularly in relation to the longitudinal direction (and the groove), the projection cannot rotate around the centerline of the lock cylinder when it is in the groove. In other words, the groove together with the projection block the rotational movement of the escutcheon in relation to the lock cylinder. Referring now to FIG. 4B, in an embodiment the escutcheon 110, when assembled with the lock cylinder 102, comprises the uncoupled state US in which the projection 114 is not in the groove 108. Then the escutcheon can rotate around the center line of the lock cylinder.

As illustrated for example in FIG. 2, the through hole 112, configured to receive the lock cylinder 102, is not in the middle of the escutcheon 110. In other words, the escutcheon is not symmetrical and therefore positioning of the escutcheon in relation to the lock cylinder is needed. The projection, when interacting with the groove, is configured to correctly position the escutcheon in relation to the lock cylinder. This enables the right (desired) position of the escutcheon in relation to the lock cylinder when they are installed into the lock case. Therefore, the rotational movement between the escutcheon and the lock cylinder shall be prevented around the central line of the lock cylinder. This is the main purpose to couple the escutcheon and the housing of the lock cylinder together.

It is possible that the lock arrangement is tried to open by force by an unauthorized person, for example. In this kind of case, violent force may be applied to the lock arrangement to get it open without a key. Force may be applied especially to the doorknob which extends from the surface of the door. As described above, the escutcheon comprises the collar covering, at least partly, the doorknob, and therefore the escutcheon is also prone to violent activities. For example, pliers may be used to get a grip from the collar of the escutcheon to rotate it. If the escutcheon is coupled with the lock cylinder, it is possible that the lock cylinder is damaged when rotating the escutcheon. This may lead to opening the whole lock arrangement. Therefore, the escutcheon comprises the uncoupled state 30 in which the projection is, at least partly, out of the groove to enable rotational movement of the escutcheon in relation to the lock cylinder. Then rotational movement of the escutcheon is not transferred to the lock cylinder, and the lock cylinder may not be damaged. Violent force refers to any inappropriate force or activities that is applied to the lock to get it open by force. In this case, violent force may refer especially to rotational movement applied to the escutcheon by pliers (or equivalent), for example. Violent force causes moving of the escutcheon from the coupled state to the uncoupled state.

In an embodiment, the escutcheon 110 is configured to move to the uncoupled state US when rotational force applied to the escutcheon 110 exceeds a predetermined value. In other words, the projection is configured to move, at least partly, away from the groove when violent force is applied to the escutcheon allowing rotational movement of the escutcheon in relation to the lock cylinder. This prevents use of the escutcheon to break the lock cylinder or removing it from the lock case.

In an embodiment, the predetermined value is less than force needed for rotating the lock cylinder 102 in relation to the lock case. The predetermined value may be less than a torque used for coupling the lock cylinder 102 with the lock case. The predetermined value may be 20-80% of the force needed to remove the lock cylinder from the lock case, for example. The lock cylinder may be fixed to the lock case by at least one fixing screw which prevents rotation of the lock cylinder in relation to the lock case. Force needed to rotate the lock cylinder in relation to the lock case may be configured to break the screw and to release the lock cylinder to rotate in relation to the lock case. The predetermined value may be remarkably smaller than this force. Then the escutcheon cannot be used to remove the lock cylinder from the lock case.

In an embodiment, at least one projection 114 is configured, at least partly, to break when the escutcheon 110 moves to the uncoupled state US. Breaking of the projection is configured to release the escutcheon to rotate in relation to the lock cylinder. The projection may be dimensioned such that it breaks when the predetermined value for rotational force of the escutcheon is exceeded. As described above, when the projection is in the groove, the escutcheon cannot rotate in relation to the lock cylinder. When the rotation force applied to the escutcheons exceeds the predetermined value, an outer surface of the projection presses against an inner surface of the groove with such force that the projection breaks. This moves the escutcheon from the coupled state to the uncoupled state and releases the escutcheon to rotate.

Figure 5A:
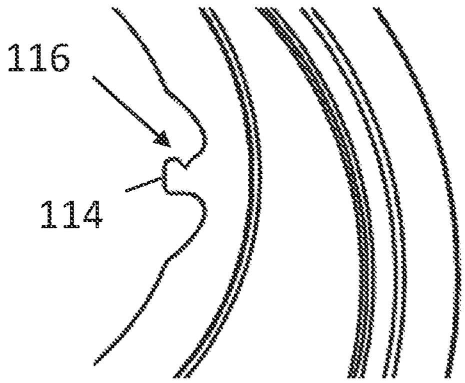
FIGS. 5A, 5B, 5C and 5D illustrate a projection of the escutcheon according to embodiments of the invention.

In an embodiment, illustrated in FIG. 5A, at least one projection 114 comprises a weakening point 116 from which the projection 114 is configured to break. The weakening point helps to control at which point the projection breaks. The weakening point may be a slot (groove) on the projection, for example. A size of the slot (depth) may be used to adjust when the projection breaks. In other words, how much rotational force must be applied on the escutcheon to break the projection. The larger the slot, the easier the projection breaks. The weakening point may be arranged such that it is, at least partly, outside of the groove when the projection is in the groove. Then the projection will break outside of the groove.

In an embodiment, at least one projection 114 is removably coupled with the escutcheon 110. The projection may be changed after breaking when it is removably coupled with the escutcheon. The projection may be coupled with the escutcheon by a coupling member. The coupling member may comprise a first member and a second member that may act as a counterpart for the first member, for example. In an embodiment, the projection may be a pin and the inner surface of the through hole may comprise a hole (cavity) for the pin. The hole may be dimensioned such that the pin stays in the hole but can be pulled out if necessary. Then the pin and the hole form the coupling member. In another embodiment, the coupling member may comprise a thread in the projection and the escutcheon. For example, the projection may comprise an external thread and the hole for receiving the projection may comprise an internal thread.

Figure 5B:
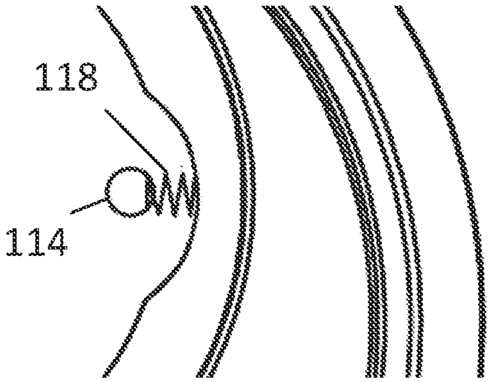
Figure 5C:
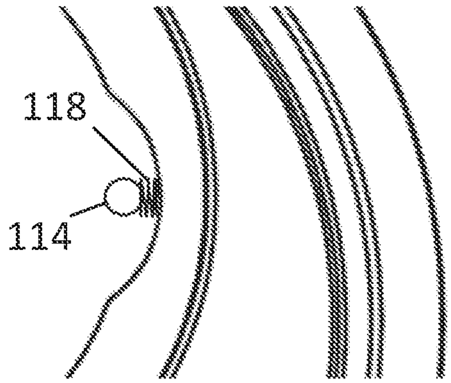

Referring now to FIGS. 5B and 5C, in an embodiment the projection 114 comprises an elastic member configured to enable movement of at least one projection 114 to groove 108 and out of the groove 108. The projection may be coupled to the escutcheon with the elastic member allowing movement of the projection at least perpendicularly in relation to the centerline of the lock cylinder. In other words, into and out of the groove. The elastic member may be a coil spring and the projection may be a ball coupled with the spring, for example. The coil spring may push the ball into the cavity, but it is also configured to compress such that the ball may move out of the groove. FIG. 5B illustrates a state in which the ball is configured to be in the groove, and FIG. 5C illustrates a state in which the spring is compressed such that the ball is out of the groove. When the escutcheon is rotated such that the predetermined value is exceeded, the spring is configured to compress and to enable the ball to move out of the groove allowing the rotational movement of the escutcheon.

Figure 5D:
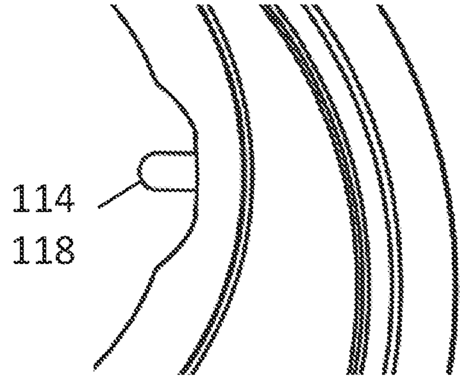

In an embodiment, the projection 114 is the elastic member 118 as illustrated in FIG. 5D. The projection may be made of elastic material like spring steel and/or rubber, for example. The projection may be a separate component coupled with the escutcheon.

Figure 6A:
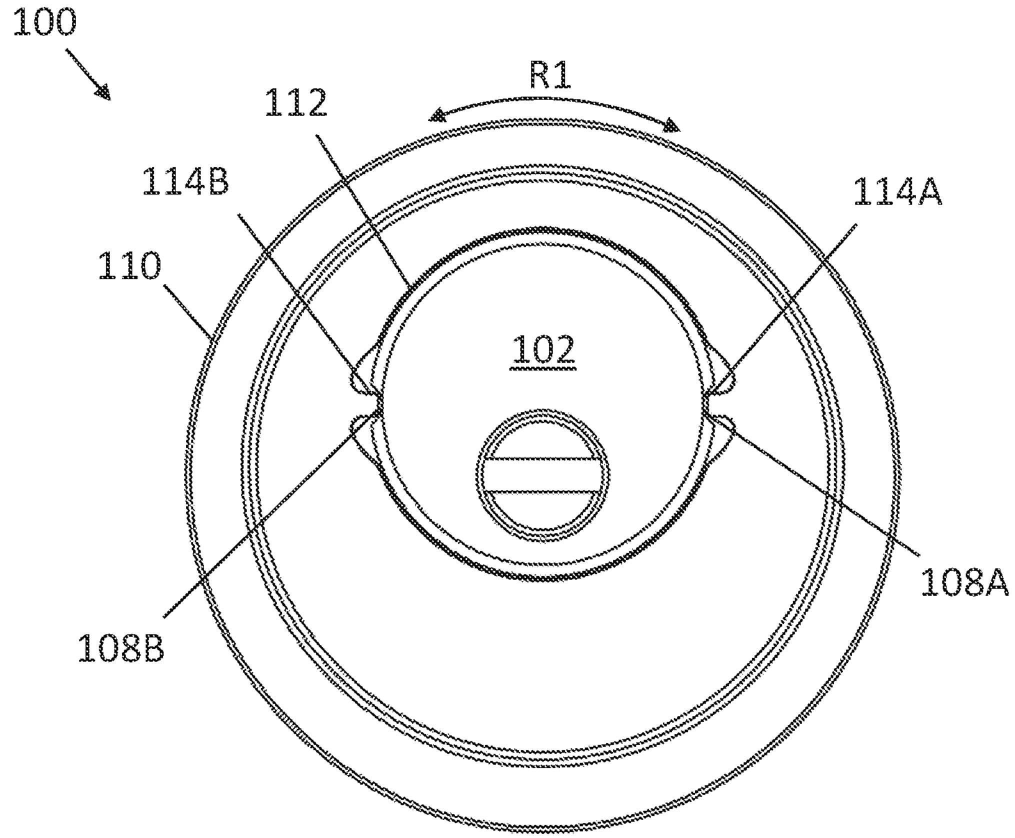
FIGS. 6A and 6B illustrate the escutcheon according to embodiment of the invention.
Figure 6B:
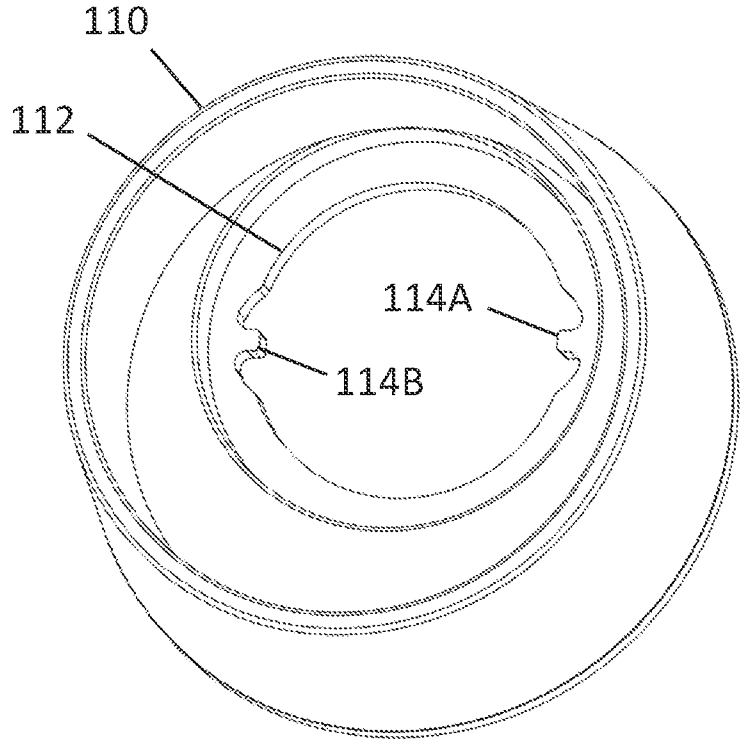

Referring now to FIGS. 6A and 6B, in an embodiment, the through hole 112 of the escutcheon 110 comprise a first and a second projection 114A-B, and the housing 104 of the lock cylinder 102 comprises a first and a second groove 108A-B, wherein the first groove 108A is configured to interact with the first projection 114A and the second groove 108B is configured to interact with the second projection 114B. The first and the second projection may comprise all the features of the projection described in this application. Two projections and grooves make the structure sturdier, and further improves positioning of the escutcheon in relation to the lock cylinder.

In an embodiment, the first projection 114A is substantially on the opposite side of the second projection 114B in the through hole 112, and the first groove 108A is substantially on the opposite side of the second groove 108B in the housing 104 of the lock cylinder 102. The first projection and the groove may be on a left side of the escutcheon and the housing, and the second projection and the groove may be on a right side of the escutcheon and the housing in the assembled state of the lock arrangement, for example.

Figure 8:
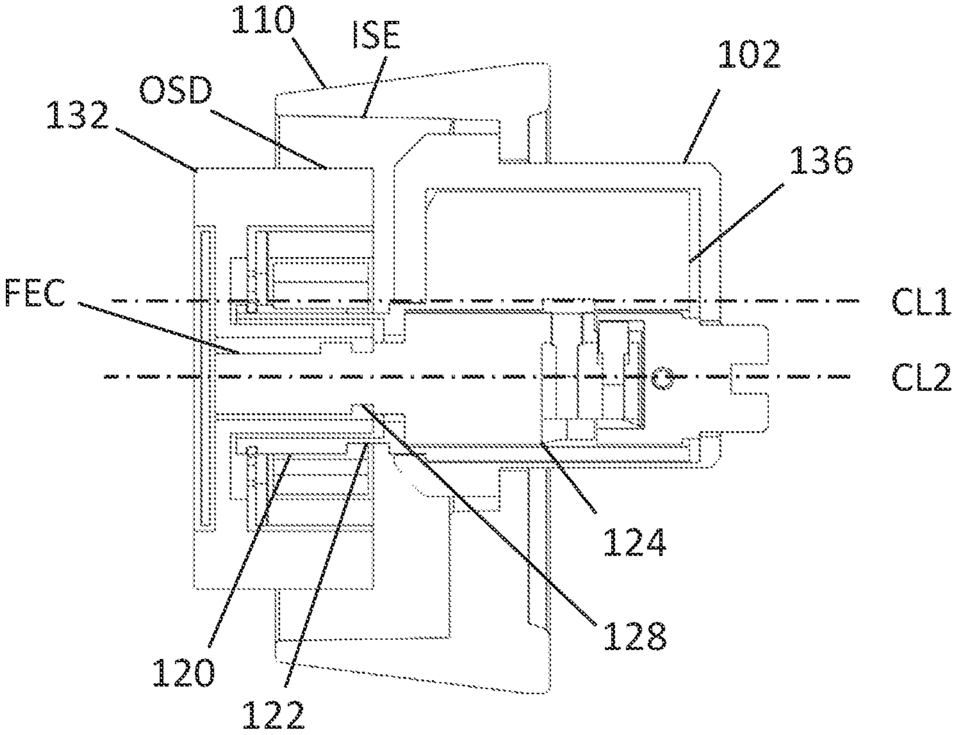
FIGS. 8 and 9 illustrate the lock arrangement according to embodiments of the invention.

Referring now to FIGS. 1 and 8, the lock cylinder 102 further comprise a shell extension 120 having a first weakening groove 122 on an outer surface covering at least partly a circumference of the shell extension 120. The lock cylinder may comprise another interchangeable lock cylinder 136 inside the main lock cylinder 102 as illustrated in FIG. 8. The purpose of the inner lock cylinder 136 is to enable modularity of the lock cylinder 102. The inner lock cylinder may be changed according to the needs, and the main lock cylinder is configured to be enable assembling of the whole lock cylinder (main cylinder with the inner cylinder) with the standard lock cases, for example. The lock core 124 may be placed inside the inner lock cylinder 136 as illustrated in FIG. 8, for example. The shell extension is a part of the inner lock cylinder and is arranged in the front end of the lock cylinder. It extends in the longitudinal direction of the lock cylinder. The shell extension may have a cylindrical hollow shape (like a pipe) as illustrated in FIG. 1, for example. The shell extension is configured to interact with the doorknob. The doorknob may comprise one or more magnets that interact with the shell extension. The doorknob may further be coupled with the shell extension to prevent movement of the doorknob in the longitudinal direction (CL2) in relation to the lock cylinder.

A centreline of the shell extension is the same as the centreline CL2 of the lock core 124. Thus, it is substantially in the middle of the escutcheon in the assembled state of the lock arrangement as illustrated in FIG. 8. When the doorknob 132 is coupled with the extension 120 (and core) it also is in the middle of the escutcheon 110, and further partly inside the collar 130. In other words, a centreline of the doorknob is the same as the centreline CL2 of the core 124, and the doorknob rotates around the centreline CL2 when rotated in use.

Referring to FIGS. 3A, 8 and 9, in the uncoupled state US the escutcheon 110 can rotate around the centreline CL1 of the lock cylinder 102. As described above, the doorknob is partly inside the collar 130 of the escutcheon 110, and the doorknob is configured to rotate around the centreline CL2 of the lock core. Because the escutcheon rotates around the different centreline than the doorknob, an outer surface OSD of the doorknob 132 can contact an inner surface ISE of the collar 130 of the escutcheon 110 when the escutcheon 100 is violently rotated in relation to the lock cylinder 102. This means that the escutcheon, due to the contact, can transfer force to the doorknob such that some components of the lock arrangement may be damaged. Rotation of the escutcheon may cause bending force (distortion) for the shell extension, for example. Therefore, the shell extension comprises the first weakening groove configured to break if force applied to the doorknob via escutcheon is too large. If the shell extension breaks, the doorknob comes off. Hence, only the shell extension is damaged, and the rest of the lock components are still undamaged and the lock stays in the locked state.

Figure 7:
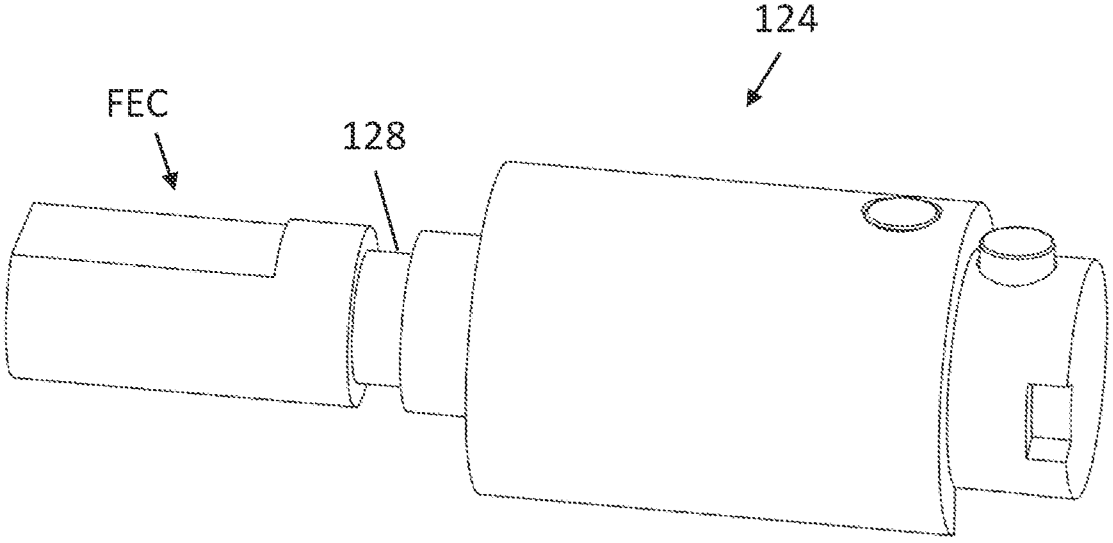
FIG. 7 illustrates a lock core according to an embodiment of the invention.

Referring now to FIGS. 7 and 8, in an embodiment, the lock arrangement 100 further comprises the core 124 having the front end FEC configured to be coupled with the doorknob, wherein the core front end FEC comprises a second weakening groove 128. The second weakening groove 128 may cover at least partly a circumference of the core front end. The front end of the core is configured to be coupled with the doorknob and to transfer rotational movement of the doorknob to the lock arrangement. Hence, in the above-described situation in which the escutcheon is violently rotated in relation to the lock cylinder and the escutcheon contacts with the doorknob, there is a risk that doorknob further transfers (bending) force for the core front end which may damage the components of the lock arrangement and lead to opening of the lock. Therefore, the front end of the core comprises the second weakening groove configured to break if force applied to the doorknob via escutcheon is too large. Hence, only the core front end and/or the shell extension is damaged, and the rest of the lock components are still undamaged and the lock stays in the locked state.

In an embodiment, the first weakening groove 122 is configured to enable breaking of the shell extension 120 nearby the lock case. The second weakening groove 128 is configured to enable breaking of the core front end FEC nearby the lock case. When the structure breaks nearby the lock case (in the vicinity of the lock case), which is inside the door, there is not significant extension left to grab onto after the break. This means that the breaking point is in the vicinity of the door surface, for example.

In an embodiment, the first and the second weakening grooves 122, 128 are substantially in the vicinity of each other in the longitudinal direction CL1 of the lock cylinder as illustrated in FIG. 8. In an embodiment, the weakening grooves may be at the same point in the longitudinal direction. Hence, the first weakening groove in the shell extension is nearby the second weakening point in the core front end in the longitudinal direction of the lock cylinder. Then breaking will happen substantially from the same place in the longitudinal direction. As described above, breaking may take place nearby the lock case.

As described above, all the features protruding from the lock arrangements are prone to violent activities. Especially escutcheon that protects the doorknob is prone to the violent activities. Some unauthorized persons may try to break the lock by grabbing the escutcheon with pliers and try to rotate it to open the lock. The solution of the invention provides the escutcheon and lock cylinder structure that enables to position the escutcheon in relation to the lock cylinder but also provides protection against violent activities.

It will be obvious to a person skilled in the art that, as the technology advances, the inventive concept can be implemented in various ways. The invention and its embodiments are not limited to the examples described above but may vary within the scope of the claims.

The invention claimed is:

1. A lock arrangement comprising:

a lock cylinder having a housing with an external thread to couple the lock cylinder with a lock case, wherein the housing further comprises a flange and at least one groove extending in a longitudinal direction of the lock cylinder, and an escutcheon having a through hole configured to receive the lock cylinder such that the flange compresses the escutcheon against a counter surface, wherein the through hole comprises at least one projection extending towards the lock cylinder, wherein the escutcheon, when assembled with the lock cylinder, comprises a coupled state in which the projection is in the groove to enable positioning of the escutcheon in relation to the lock cylinder, and to prevent rotational movement of the escutcheon in relation to the lock cylinder around the longitudinal direction of the lock cylinder such that the escutcheon rotates with the lock cylinder, and an uncoupled state in which the projection is at least partly out of the groove to enable rotational movement of the escutcheon in relation to the lock cylinder to prevent rotation of the lock cylinder with the escutcheon.

2. The lock arrangement of claim 1, the escutcheon is configured to move to the uncoupled state when rotational force applied to the escutcheon exceeds a predetermined value.

3. The lock arrangement of claim 2, wherein the predetermined value is less than force for rotating the lock cylinder in relation to the lock case.

4. The lock arrangement of claim 2, wherein at least one projection is configured, at least partly, to break when the escutcheon is moving to the uncoupled state.

5. The lock arrangement of claim 4, wherein at least one projection comprises a weakening point from which the projection is configured to break.

6. The lock arrangement of claim 1, wherein the at least one projection is removably coupled with the escutcheon.

7. The lock arrangement of claim 1, wherein the projection comprises an elastic member configured to enable movement of at least one projection to the groove and out of the groove.

8. The lock arrangement of claim 7, wherein the projection is the elastic member.

9. The lock arrangement of claim 1, wherein the through hole of the escutcheon comprises a first and a second projection, and the housing of the lock cylinder comprises a first and a second groove, wherein the first groove is configured to interact with the first projection and the second groove is configured to interact with the second projection.

10. The lock arrangement of claim 9, wherein the first projection is substantially on the opposite side of the second projection in the through hole, and the first groove is substantially on the opposite side of the second groove in the housing of the lock cylinder.

11. A lock arrangement comprising:

a lock cylinder having a housing with an external thread to couple the lock cylinder with a lock case, wherein the housing further comprises a flange and at least one groove extending in a longitudinal direction of the lock cylinder, and an escutcheon having a through hole configured to receive the lock cylinder such that the flange compresses the escutcheon against a counter surface, wherein the through hole comprises at least one projection extending towards the lock cylinder, wherein the escutcheon, when assembled with the lock cylinder, comprises a coupled state in which the projection is in the groove to prevent rotational movement of the escutcheon in relation to the lock cylinder around the longitudinal direction of the lock cylinder, and an uncoupled state in which the projection is at least partly out of the groove to enable rotational movement of the escutcheon in relation to the lock cylinder, wherein the lock cylinder further comprises a shell extension having a first weakening groove on an outer surface covering at least partly a circumference of the shell extension.

12. A lock arrangement comprising:

a lock cylinder having a housing with an external thread to couple the lock cylinder with a lock case, wherein the housing further comprises a flange and at least one groove extending in a longitudinal direction of the lock cylinder, and an escutcheon having a through hole configured to receive the lock cylinder such that the flange compresses the escutcheon against a counter surface, wherein the through hole comprises at least one projection extending towards the lock cylinder, wherein the escutcheon, when assembled with the lock cylinder, comprises a coupled state in which the projection is in the groove to prevent rotational movement of the escutcheon in relation to the lock cylinder around the longitudinal direction of the lock cylinder, and an uncoupled state in which the projection is at least partly out of the groove to enable rotational movement of the escutcheon in relation to the lock cylinder, wherein the lock arrangement further comprises a core having a front end configured to be coupled with a doorknob, wherein the core front end comprises a second weakening groove covering at least partly a circumference of the core front end.

13. The lock arrangement of claim 11, wherein the first weakening groove is configured to enable breaking of the shell extension nearby the lock case and the second weakening groove is configured to enable breaking of the core front end nearby the lock case.

14. The lock arrangement of claim 13, wherein the first and the second weakening grooves are substantially in the vicinity of each other in the longitudinal direction.

15. The lock arrangement of claim 12, wherein the first weakening groove is configured to enable breaking of the shell extension nearby the lock case and the second weakening groove is configured to enable breaking of the core front end nearby the lock case.

16. The lock arrangement of claim 15, wherein the first and the second weakening grooves are substantially in the vicinity of each other in the longitudinal direction.

* * * * *